United States Patent [19]

Hosoda

[11] Patent Number: 4,807,297
[45] Date of Patent: Feb. 21, 1989

[54] NEIGHBOR IMAGE PROCESSING DEVICE

[75] Inventor: Makoto Hosoda, Shizuoka, Japan

[73] Assignee: Hamamatsu Photonics Kabushiki Kaisha, Shizuoka, Japan

[21] Appl. No.: 900,515

[22] Filed: Aug. 26, 1986

[30] Foreign Application Priority Data

Aug. 27, 1985 [JP] Japan ................................ 60-187586

[51] Int. Cl.$^4$ ............................................. G06K 9/56
[52] U.S. Cl. ...................................... 382/27; 382/19; 358/160
[58] Field of Search .................... 382/27, 19; 358/160, 358/37, 36, 167, 166

[56] References Cited

U.S. PATENT DOCUMENTS

| | | | |
|---|---|---|---|
| 3,999,047 | 12/1976 | Green | 382/27 |
| 4,415,880 | 11/1983 | Scott | 382/27 |
| 4,484,349 | 11/1984 | McCubbrey | 382/27 |
| 4,667,295 | 5/1987 | Preston, Jr. | 382/27 |

Primary Examiner—James J. Groody
Assistant Examiner—Michael D. Parker
Attorney, Agent, or Firm—Finnegan, Henderson, Farabow, Garrett, & Dunner

[57] ABSTRACT

A neighbor image processing device for processing image data according to predetermined program comprises: an address generator for simultaneously generating addresses corresponding to each of a central point and a plurality of individual neighbor points of an image neighbor region; a buffer memory for simultaneously receiving data on the points, and their corresponding addresses from the address generators; a central processor coupled to the address generator and the buffer memory for comparing the neighbor point data with data on the central point of the neighbor region; an arithmetic and logic unit connected to the central processor for selectively modifying the data simultaneously for the individual points according to instructions from the central processor; a data integration unit for receiving a plurality of simultaneous outputs from the arithmetic and logic unit and generating a single output based on instructions from the program; and a decision integrator for receiving a plurality of the single outputs from the data integrator and generating a coded multi-value based on instructions from the program.

8 Claims, 2 Drawing Sheets

NEIGHBOR IMAGE PROCESSING DEVICE

BACKGROUND OF THE INVENTION

1. Field of the Invention

This invention relates to neighbor image processing devices for processing picture elements.

2. Description of the Prior Art

Heretofore, a mask type processing device as shown in FIG. 2 has been employed for image neighbor processing. The conventional device has a plurality of series-connected shift registers each corresponding to one horizontal line, to which image data read out of the TV camera or the image memory are applied.

The data are loaded in a read tap register through the intermediate connecting points of the shift register, and neighbor data read out in a parallel mode (FIG. 2 showing the case of 3×3 neighbors) are applied to an arithmetic unit array or the like. Thus, the operation is performed in the manner of a pipe line to obtain the outputs sequentially, or one by one.

The sequential outputs thus obtained are displayed as they are, or written in the image memory so that they are processed later.

The above-described mask type processing device using shift registers suffers from a number of difficulties. For example, the operation is fixed for one process. Therefore, it is difficult to vary the operation for every part of an image, so that all the parts of the image may be processed uniformly. In addition, since the shift registers are fixed in length, it is difficult to change the configuration of the masked region. Thus, it is extremely difficult to change the operation and the configuration of the masked region for successive picture elements based on the conditions or configuration of a previous picture element.

Because the image data is inputted sequentially, the neighbor images to be processed cannot be shifted or accessed in random order. Also, in the case of a larger mask, it is often necessary to add hardware in order to process the images properly.

Accordingly, an object of this invention is to provide a neighbor image processing device in which the above-described difficulties accompanying a conventional mask type processing device have been eliminated and a flexible processing operation can be carried out at high speed.

Another object of the invention is to allow random access to data on neighbor images for more efficient processing.

It is also an object of the invention to increase the speed of neighbor image processing without significant added hardware.

Additional objects and advantages will be obvious from the description, or may be learned by practice of the invention.

SUMMARY OF THE INVENTION

According to the present invention, the neighbor image processing device for processing image data according to a predetermined program is provided to achieve the foregoing objects and advantages. The device comprises address generating means for simultaneously generating addresses corresponding to each of a central point and a plurality of individual neighbor points of an image neighbor region; buffer memory means for simultaneously receiving data on the points, and their corresponding addresses from the address generating means; central processor means coupled to the address generating means and the buffer memory means for comparing the neighbor point data with data on the central point of the neighbor region; arithmetic and logic means connected to the central processor means for selectively modifying the data simultaneously for the individual points according to instructions from the central processor means; data integration means for receiving a plurality of simultaneous outputs from the arithmetic and logic means and generating a single output based on instructions from the program; and decision integrating means for receiving a plurality of the single outputs from the data integration means and generating a coded multivalue based on instructions from the program.

Preferably the address generating means includes a first array of adders. It is also preferred that the data integrating means include a second array of adders. The second array may be tree shaped.

It is preferred that the buffer means include a plurality of individual buffer memories, and the arithmetic and logic means include a plurality of corresponding individual arithmetic units, one arithmetic unit being connected to each of the buffer memories. Each buffer memory may comprise a high speed cache memory. In addition, each arithmetic unit may include a transistor-to-transistor logic circuit.

The central processor means may include an arithmetic and logic unit having a transistor-to-transistor logic circuit therein. Preferably, the device also includes memory means for storing the programs to be executed by the processing device.

BRIEF DESCRIPTION OF THE DRAWINGS

The accompanying drawings, which constitute a part of the specification, illustrate one embodiment of the invention, and, together with the description, serve to explain the principles of the invention.

Of the drawings.

DESCRIPTION OF THE PREFERRED EMBODIMENT

This invention will be described with reference to FIG. 1 in more detail.

Figure 1:
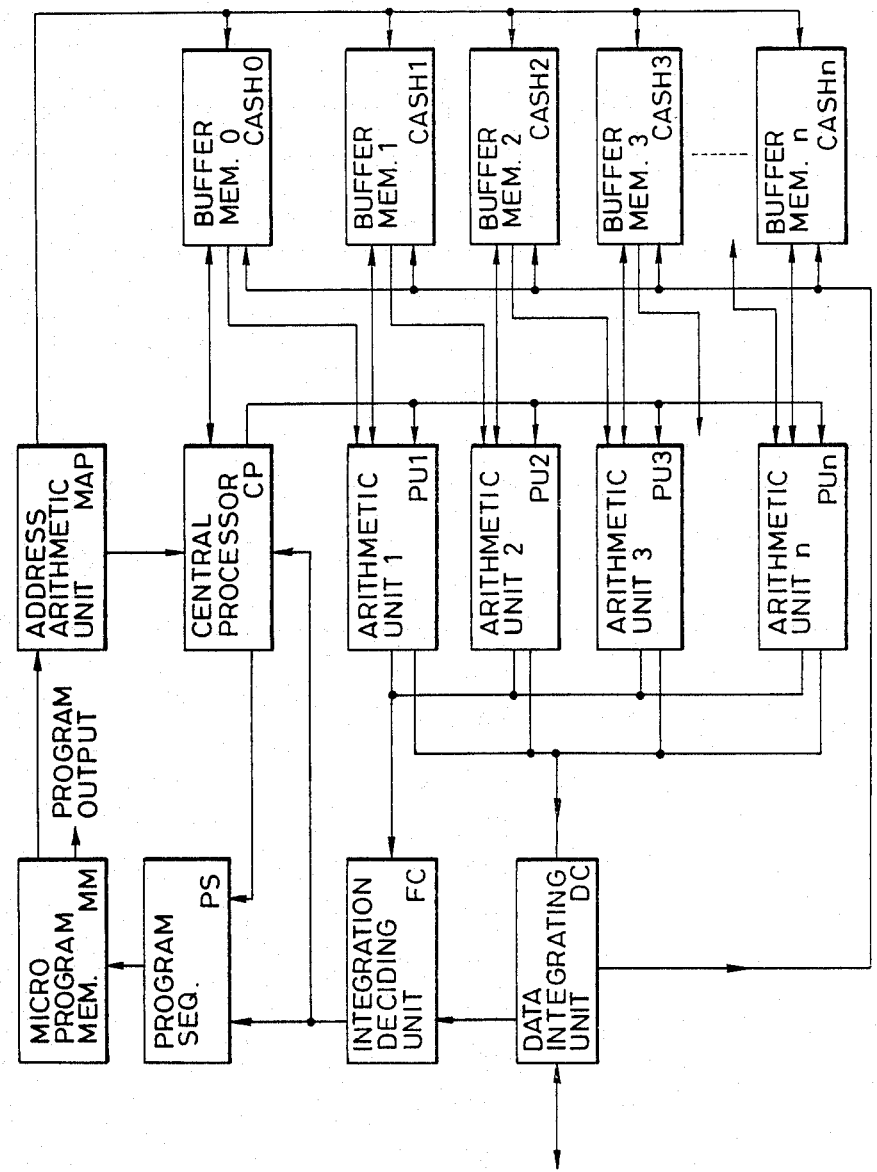
FIG. 1 is a block diagram showing one example of a neighbor image processing device according to this invention.

FIG. 1 is a block diagram showing one example of a neighbor image processing device according to the invention.

In FIG. 1, an address arithmetic unit MAP operates as follows: According to the data on the central point in an image neighbor region and its configuration which is specified by a micro program memory MM for every step of a program or specified by a register value stored in the address arithmetic unit MAP or a central processor CP, the address arithmetic unit MAP calculates the coordinates of a number of picture elements in the aimed region in a parallel mode, at the same time.

In the embodiment, the address arithmetic unit MAP is an array of adders.

The buffer memories in a buffer memory section (CASH0 through CASHn) are connected to the arithmetic units (PU1 through PUn) in an arithmetic unit section PU, thus forming independent buffer memories In other words, the buffer memories CASH0 through CASHn are connected directly or closely to the central processor CP and the arithmetic units PU1 through PUn without using a bus.

These memories are high-speed cache memories, and are not memories which are coarsely connected thereto through a low-speed bus: that is, they are provided only for the processor.

The addresses of the buffer memories CASH0 through CASHn may be different from one another and are given independently and simultaneously in a parallel mode by the address arithmetic unit MAP. The arithmetic units PU1 through PUn can read and write the image data of a number of points simultaneously in a parallel mode according to the addresses provided by the address arithmetic unit MAP.

Each of the arithmetic units PU1 through PUn obtains one arithmetic result through arithmetic and logic operations on some of three inputs, and this can be accomplished by using, for instance, a TTL circuit.

The central processor CP performs a decision according to the picture element value read from the central coordinates of the neighbor region, and applies it to the following arithmetic units PU1 through PUn.

The central processor CP may be, for instance, an ALU (arithmetic and logic unit) utilizing TTL (transistor-to-transistor logic) which provides one operation flag according to one input result.

It is not always necessary that the coordinates of the central point be exactly the central point in the aimed neighbor region. Since the coordinates of the central point are used as reference data for the address arithmetic unit MAP to provide the addresses of the points in the aimed neighbor region, instead of the precise coordinates, the coordinates of a point inside the region or outside it may be employed.

Utilizing the result of the decision by the central processor CP and the picture element values provided by the buffer memory section CASH, the arithmetic units PU1 through PUn carry out the logic and arithmetic operations specified by the program simultaneously in a parallel mode, and output the results of the operations at the same time.

Figure 2:
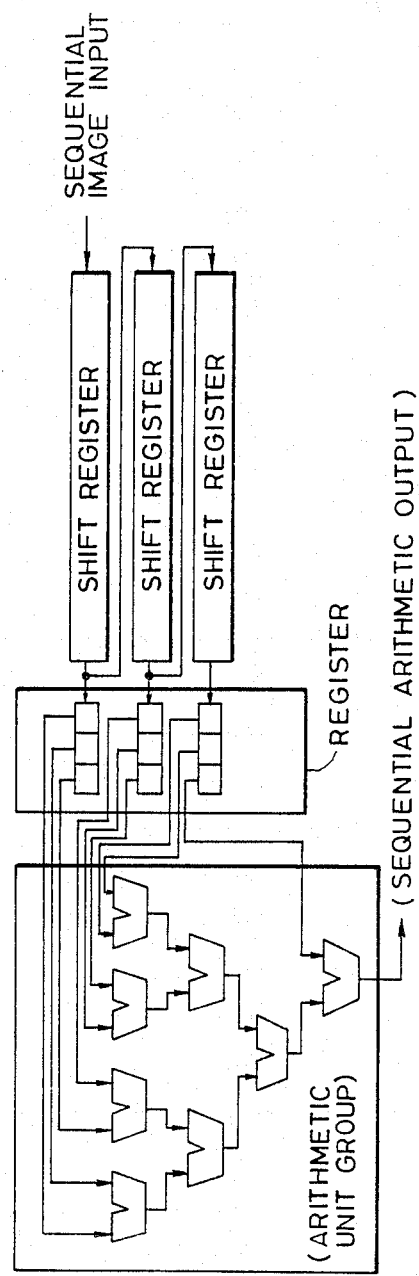
FIG. 2 is a block diagram showing one typical example of the arrangement of a conventional neighbor image processing device.

A data integrating unit DC receives a plurality of results outputted by the arithmetic units PU1 through PUn, and calculates a single result and outputs it. In the above-described embodiment, the data integrating unit DC may be an array of adders. A tree-shaped adder, similar to the group of arithmetic units shown in FIG. 2, may be used as the data integrating unit DC.

An integration deciding unit FC performs a logic operation by using a plurality of results outputted by the above-described data integrating unit DC, and outputs its state as a coded multi-value. The integration deciding unit FC may be made up of a programmable logic array.

A program sequencer PS determines the next microprogram step according to the decision code provided by the integration deciding unit FC.

In the embodiment, a look-up table utilizing memories or the like is employed as the integration deciding unit. Programs to be executed in the neighbor image processing device are stored in the program storing memory MM. The program output provided by the microprogram memory MM controls the central processor CP, the arithmetic unit section PU, the buffer memory section CASH, the data integrating circuit DC, and the data integration deciding unit FC.

One example of the operation of the neighbor image processing device thus organized will be described with reference to the removal of a small solitary point in a shaded image.

For illustration purposes, a 3×3 neighbor mask is considered for a point to be eliminated.

(1) If, with respect to the central point thereof, all the 8-neighbors have values higher than a given threshold value, and the central point has a value lower than the threshold value, then the average of the values of the 8-neighbors is assigned to the central point.

(2) If all the 8-neighbors have values lower than the threshold value and the central point has a value higher than the threshold value, then zero (0) is assigned to the central point.

(3) In the other cases where the values of the 8-neighbors do not satisfy one of the above conditions, nothing is done. The result of the above-described operation is stored in the buffer memory CASH0 The buffer memory has a source region, and a destination region.

The procedure is as described below:

Step 0

The address arithmetic unit MAP, while producing the coordinates of all the picture elements in an aimed image region, provides, with each set of central coordinates, its neighbor coordinates.

Step 1

In response to access to one neighbor, the central processor CP determines whether or not the value inputted to the central processor CP exceeds the threshold value, and the result of this determination is transmitted to the arithmetic unit section PU and the program sequencer PS. At the same time, the threshold value decisions are carried out in all the arithmetic units in the arithmetic unit section PU, and the results of these decisions are supplied to the deciding unit FC. According to these data, the program sequencer PS determines the next microprogram sequence.

Step 2

According to the above-described conditions (1), (2) and (3), the average value calculated by the data integrating unit DC through the arithmetic unit section PU, the constant value "0(zero)" provided by the data integrating unit DC, or the central point's value latched by the central processor CP is written into the corresponding destination address in the buffer memory CASH0.

Step 3

The above-described operations are carried out for all of the picture elements, and the procedure is complete.

Now, the 3×3 mask process will be described.

Step 0

The initialization is carried out by reading the following data out of the microprogram memory:

(1) The weight of the mask is loaded in a register in each of the arithmetic units.

(2) Address generation control data are inputted to the address arithmetic unit.

(3) A deviation value corresponding to a deviation between the different addresses of an aimed point and the central point's coordinate of the mask address produced by the address arithmetic unit is loaded to a plurality of arithmetic circuits in the address arithmetic unit according to an address code from the microprogram memory.

Step 1

All images to be processed are inputted to nine (9) buffer memories CASH0 through CASH8 by by-passing the data integrating unit DC and passing the image data directly to the buffer memories.

Step 2

The different addresses of an aimed point and its neighbors are simultaneously produced by the address arithmetic unit MAP, and the contents of the buffer memories are read out at the same time.

Step 3

The data thus read out are multiplied by the corresponding mask's content, and the results are applied to the data integrating unit DC.

Step 4

The sum of these results is obtained by the data integrating unit, and written in the corresponding address in the buffer memory.

The above-described operations are repeatedly carried out for all the images.

The neighbor image processing device according to the invention is designed and operated as described above. In the conventional device described previously, different hardware is required for different processes. By contrast, in the device of the invention, high-speed processing may be performed with the same hardware. Furthermore, the device of the invention has a variety of applications, and can accomplish the image processing with fewer steps than the conventional apparatus.

I. In each of the steps, the type of operation can be readily changed.

II. In each of the steps, the result of operation can be fed back or recycled.

III. In each of the steps, the region to be processed can be changed or skipped randomly on command.

IV. In each of the steps, the outputted result of operation can be immediately accessed again.

V. Depending on the particular processing program writing method and the buffer memory method used, the processors can operate in a parallel mode, independently of one another.

In the device of the invention, the contents of the image data are stored in buffer memories closely coupled to the processors instead of the image memory body, and are then read out and operated at high speed by being addressed directly by the address processor, so that the processing speed can be increased.

Various modifications and variations could be made in the invention without departing from the scope or spirit of the invention.

What is claimed is:

1. A neighbor image processing device for processing image data according to a predetermined program comprising:

address generating means for simultaneously generating address corresponding to each of a central point and a plurality of individual neighbor points of an image neighbor region;

buffer memory means for simultaneously receiving data on the points, and their corresponding addresses from said address generating means;

central processor means coupled to said address generating means and said buffer memory means for comparing the neighbor point data with data on the central point of the neighbor region;

arithmetic and logic means connected to said central processor means for selectively modifying the data simultaneously for the individual points according to the instructions from said central processor means;

data integration means for receiving a plurality of simultaneous outputs from said arithmetic and logic means and generating a single output based on instructions from the program;

decision integrating means for receiving a plurality of the single outputs from said data integration means and generating a coded multi-value based on instructions from the program; and memory means for storing the program to be executed by said processing device.

2. The device of claim 1 wherein said address generating means includes a first array of adders.

3. The device of claim 2 wherein said data integrating means includes a second array of adders.

4. The device of claim 3 wherein said second array is tree shaped.

5. The device of claim 1 wherein said buffer memory means includes a plurality of individual buffer memories, and said arithmetic and logic means includes a plurality of corresponding individual arithmetic units, one arithmetic unit being connected to a corresponding one of said buffer memories.

6. The device of claim 5 wherein each buffer memory comprises a high speed cache memory.

7. The device of claim 6 wherein each arithmetic unit includes a transistor-to-transistor logic circuit.

8. The device of claim 1 wherein said central processor means includes an arithmetic and logic unit having a transistor-to-transistor logic circuit therein.

* * * * *